Patented Nov. 3, 1936

2,059,905

UNITED STATES PATENT OFFICE 2,059,905

METHOD OF MAKING IMPROVED BREAD PRODUCT

Raymond Powers, Syracuse, N. Y., assignor to The Borden Company, New York, N. Y., a corporation of New Jersey No Drawing. Application August 1, 1934, Serial No. 737,928

12 Claims. (Cl. 99—90)

This invention relates to the production of an improved food product and more particularly to the production of a bread of greatly increased nutritive value.

In the production of bread, it has been the practice to use water or milk containing relatively small quantities of milk solids in the preparation of the dough for baking. The amount of milk solids which could be included in the loaf of commercially acceptable bread has been strictly limited. When liquid milk is used, the amount is limited by the softness of the dough, too much liquid obviously making a dough which is soft and sticky. The amount of milk solids which can be incorporated into the dough in the form of whole milk is limited to about 9% of the weight of the flour.

Where sweetened condensed milk is used in the production of bread, the amount that can be used is limited because of the high sugar content of the sweetened condensed milk. About 8½% of the weight of the flour, in the form of milk solids, is about the maximum that can be used in the production of such bread, and even this is too sweet for many people.

When powdered milk is used in considerable quantities and is mixed into the dough in the usual way, it results in a marked decrease in volume and/or impairment of texture of the loaf. The resulting loaf is heavy and lacking in "oven spring". (A term used in the baking industry indicating the ability of the dough to rise very rapidly during the first few minutes of baking). This is quite noticeable when as much as 6% of powdered milk, based on the weight of flour, is used and increases with increasing amounts of powdered milk.

For these reasons the dough used in preparing milk bread previously on the market usually contained about 1 to 6% of milk solids based on the amount of flour used. Bread from dough containing considerably larger quantities of milk solids, mixed and baked by ordinary known methods, is of poor texture, of coarse grain, of very small volume and will have a burned crust. It would be, in fact, small and soggy and far from a commercially acceptable loaf of white bread. By a commercially acceptable loaf of white bread is meant one having the crust color substantially unburned; the crumb having a creamy color free from lumps and dark streaks; being of reasonably fine even grain, free from the coarse center characteristic of overproof; having a good oven spring, a pleasant taste; and the average volume of the whole loaf being not less than 7 cubic inches per ounce of bread.

It is an object of my invention to provide an improved method for preparing bread whereby a much higher percentage of milk solids may be incorporated. A further object is to provide a method whereby the physical characteristics of such a loaf may be greatly improved and a commercially acceptable loaf may be prepared containing greatly increased proportions of milk solids. Other objects will become apparent.

By following my improved method a commercially acceptable loaf of white bread may be prepared from a dough containing from 30 to 40% of powdered whole milk, depending upon the flour used and other conditions, such as the butter fat content of the milk, the particular characteristic desired in the finished product and the conditions available for preparing and baking the dough, the usual optimum quantity being about 35% powdered whole milk. Beyond these quantities, the volume of the loaf begins to diminish. Similarly, in using powdered skim milk, it is possible to make a commercially acceptable loaf of white bread from a dough containing from 20 to 30% of powdered skim milk, the usual optimum being about 26% of powdered skim milk. In each case the bread will contain approximately the same quantity of milk solids other than fat and the additional fat present in the powdered whole milk has only a slight effect upon the mixing and baking of the dough. The percentages used herein are based upon the weight of flour, in accordance with the usual bakery practice.

The improved method includes the mixing of the dough for a much longer time than that ordinarily used in the production of bread under the same conditions. For example, the dough should be mixed from two to five times as long as the optimum time required in the preparation of a water dough or a dough containing about 6% of milk. This amount of mixing would be sufficient to give a distinctly over-mixed dough without milk or with the usual percentage of milk solids; that is, one that would be sticky and "dead".

Also, the oven heat during the baking of the loaf should be about 20% less than that ordinarily used in the production of white bread under the same conditions, for example, a temperature of about 360° to 380° F. should be used as compared with about 430 to 450° F. for an ordinary white bread, without milk or from a dough containing about 6% milk, in the same oven and with the same sized loaf and pan, the baking time in each case depending upon the weight of the loaf. The baking oven temperatures referred to herein are the temperatures at about the level of the top of the loaf and vary considerably in commercial practice but, in the same oven and under the same conditions, are substantially lower with the higher concentration of milk solids than the preferred temperatures in the prior practice.

Furthermore, it has been found that the amount of water should be very considerably increased, for instance, to about 75 to 90% of the weight of the flour as compared with about 60% with ordinary water bread dough and about 66% with a dough containing 6% of milk solids, assuming that all other ingredients and conditions remain unchanged.

Similar differences in procedure would be used with powdered skim milk or powdered partially skimmed milk, making due allowance for the fact that powdered whole milk contains approximately 27% butter fat, whereas powdered skim milk contains substantially no fat and powdered partially skimmed milk contains any amount of butter fat up to about 27%. To obtain the same milk solids-not-fat in the loaf, a smaller percentage of powdered skim milk or powdered partially skim milk will be required. Those powdered milk products containing more butter fat than normal powdered whole milk, up to and including powdered cream which contains 71% or more of butter fat, may be used in a similar manner, due allowance being made for the larger proportion required to give the same proportions of milk solids-not-fat in the loaf.

The improved process may also be used with other milk products or mixtures of milk products giving proportions of milk solids-not-fat and butter fat similar to those indicated above. For instance, evaporated milk (whole or skim) may be used alone or with the powdered milk or a mixture of powdered milk and butter, sweetened condensed milk (whole or skim), and/or cream, or similar mixtures of milk products may be used to give the amounts of total milk solids or milk solids-not-fat described herein.

As a specific example of the improved process, 90 parts of water, may be placed in the dough mixer and 35 parts of powdered whole milk, 4 parts of sugar, 2 parts of salt, 2 parts of yeast and 2 parts of fat may be added to it and agitated. When these are dissolved or dispersed in the water, 100 parts of flour is added. The mixture is then mixed from 2 to 5 times as long as would be required with an ordinary bread dough, without milk, in the same equipment and under the same conditions. With a high speed dough mixer, that is, a mixer rotating at about 60 to 90 R. P. M., this mixing may be for about 19 minutes, which is about 4 times the optimum time for mixing ordinary bread dough without milk in such a mixer, all other conditions remaining the same.

The temperature of the dough after mixing may be about 78 to 84° F., preferably about 80° F. Because of the longer mixing time and the greater amount of heat generated, it is preferable to start with the mixture somewhat cooler than in the production of water bread or bread from dough with about 6% of milk solids. This temperature may be controlled by temperature of the water used, which will, of course, vary with the temperature of the room, the initial temperature of the other ingredients etc. and if necessary chopped ice in the water or refrigeration may be used to give the required temperature to the mixed dough. The dough should be allowed to ferment, proof, etc. and be handled otherwise like ordinary bread, except that the proof time may be a little longer.

The dough may then be baked for the usual time with a marked reduction in the heat of the oven, a suitable oven temperature being about 360° to 380° F. depending upon the size of the loaf.

In using powdered skim milk, the same formula and method may be used except that up to about 30 parts of powdered skim milk and about 85 parts of water are used, the optimum being about 26 parts of powdered skim milk to 100 parts of flour. Other milk products or combinations of milk products may be used in corresponding amounts to give the amounts of whole or skim milk solids referred to herein, making due allowance for the composition of each.

The preferred form of powdered milk for this purpose is one which has been shown to have good baking qualities by a previous baking test.

By following the procedure described above, the bread produced will have the grain, color and texture required in commercial white bread, and the volume and other external characteristics customary in commercial pan bread. For example, when cooled at room temperature for 2 hours after baking, its volume will be not less than 7 cubic inches per ounce.

Such bread has nutritive properties never before equaled in white bread. For example, when made with 35% of powdered whole milk, based on the weight of the flour, each pound of the bread will contain as much nutritive value as 22.4 ounces of liquid whole milk or 0.656 quart. Ordinary white bread without milk contains about 0.35% of ash (exclusive of added salt), whereas this bread will contain not less than 1.27% ash (exclusive of added salt). This bread also contains vitamins A, B, D, and G in substantial potencies. This bread contains 16.8% by weight of whole milk solids. A loaf of this bread will contain 4.55% milk protein, 6.25% lactose, 4.54% milk fat and 0.983% mineral matter from milk. It contains approximately 10.5% total protein, 44% total carbohydrates and 6% total fat, in addition to the mineral matter. One quarter of a pound of this bread will provide 27.3% of the protein, 11% of the calories, 73% of the calcium and 34% of the phosphorus required by the average man for one day. Compared with water bread, this bread contains 1.28 times as much protein, 0.857 times as much carbohydrates, 2.98 times as much fat, 20 times as much calcium and 3.9% as much phosphorus. The loss of moisture in baking this bread is no greater than for other breads, and the moisture content of the loaf one hour after baking does not exceed 38%.

A bread product made as described above, from a dough containing 20 to 40% milk solids, will contain about 10 to 15% of milk solids—not fat, and about 10 to 19% of total milk solids, depending upon the amount of butter fat in the milk product used. The finished bread product may include the following milk solids in about the proportions given, based upon the weight of the finished bread:

| | Per cent |
|---|---|
| Milk protein | 3.9 to 5.8 |
| Lactose | 5.4 to 8.1 |
| Milk fat | trace to 5.45 |
| Inorganic salts of milk | 0.78 to 1.2 |

As compared with a commercially acceptable bread without milk this bread would contain:

| | Times as much |
|---|---|
| Protein | 1.0 to 1.5 |
| Carbohydrates | 0.65 to 1.0 |
| Fat | trace to 3.4 |
| Calcium | 15.5 to 23 |
| Phosphorus | 3 to 4.5 |

No claim is made herein to the above product which is claimed in the copending application of Clarence S. Stevens and the applicant, filed August 1, 1934, Serial No. 737,950, entitled "Improved bread product."

The specific examples of times, temperatures, proportions, etc., given above, have been given as illustrative and it is not intended to limit the invention to the particular embodiments given, it being obvious that under varying conditions such as differences in equipment, differences in ingredients used, difference in products desired, etc., various modifications, which will be obvious to one skilled in the art, must be made to meet the new conditions.

The terms used in describing and claiming the invention have been used in their descriptive sense and not as terms of limitation and it is intended that all equivalents thereof be included within the scope of the appended claims.

I claim:

1. In the production of bread, the steps of including with the other ingredients of bread dough about 20 to 40% of milk solids, and about 75 to 90% of water, based upon the weight of flour, and mixing the dough two to five times as long as the optimum mixing time under the same conditions for bread dough without milk.

2. In the production of bread, the steps of including with the other ingredients of bread dough about 26% of milk solids other than fat and about 85% of water, based upon the weight of flour, and mixing the dough 2 to 5 times as long as the optimum mixing time under the same conditions for bread dough without milk.

3. In the production of bread the steps of adding to the other ingredients of bread dough about 35% of powdered whole milk and about 90% of water based upon the weight of flour and mixing the dough about 4 times as long as the optimum mixing time under the same conditions for bread dough without milk.

4. In the production of bread the steps of adding to the other ingredients of bread dough about 26% of powdered skim milk and about 85% of water based upon the weight of flour and mixing the dough about 4 times as long as the optimum mixing time under the same conditions for bread dough without milk.

5. In the production of bread the steps of adding to the other ingredients of bread dough about 30 to 40% of powdered whole milk and 75 to 90% of water, both based upon the weight of flour, and mixing the dough about two to five times as long as the optimum time under the same conditions for bread dough without milk.

6. In the production of bread the steps of adding to the other ingredients of bread dough about 20 to 30% of powdered skim milk and 75 to 90% of water, both based upon the weight of flour, and mixing the dough about 2 to 5 times as long as the optimum time under the same conditions for bread dough without milk.

7. The process as defined in claim 1 including the step of baking the bread at an oven temperature about 20% less than the optimum temperature used under the same conditions for baking a dough without milk.

8. The process as defined in claim 1 including the step of baking the dough at about 360 to 380° F.

9. The process as defined in claim 5 including the step of baking the dough at about 360° F. to 380° F.

10. The process as defined in claim 6 including the step of baking at about 360 to 380° F.

11. In the production of bread the steps of adding to the other ingredients of bread dough about 35% of powdered whole milk and about 90% of water, both based upon the weight of flour, mixing the dough in a high speed dough mixer for about 19 minutes, and baking the dough at an oven temperature of about 360° F.

12. In the production of bread the steps of adding to the other ingredients of bread dough about 26% of powdered skim milk and about 85% of water, both based upon the weight of flour, mixing the dough in a high speed dough mixer for about 19 minutes, and baking the dough at an oven temperature of about 360° F.

RAYMOND POWERS.